United States Patent [19]
Yagi et al.

[11] 3,933,134
[45] Jan. 20, 1976

[54] METHOD AND APPARATUS USING PROPORTIONAL RESIDUAL GAS STORAGE TO REDUCE NO$_x$ EMISSIONS FROM INTERNAL COMBUSTION ENGINES

[75] Inventors: Shizuo Yagi, Asaka; Kazuo Inoue, Ianashi, both of Japan

[73] Assignee: Honda Giken Kogyo Kabushiki Kaisha, Tokyo, Japan

[22] Filed: Oct. 11, 1973

[21] Appl. No.: 405,483

[52] U.S. Cl. ........ 123/32 SP; 123/75 B; 123/32 SA; 123/191 SP
[51] Int. Cl.² .................... F02B 19/10; F02B 19/16
[58] Field of Search ......... 123/32 ST, 32 SP, 32 SA, 123/191 S, 191 SP, 75 B

[56] References Cited
UNITED STATES PATENTS

| | | | |
|---|---|---|---|
| 820,285 | 5/1906 | Cross | 123/32 SP |
| 1,616,157 | 2/1927 | Werner | 123/32 SP |
| 2,422,610 | 6/1947 | Bagnulo | 123/32 SP |
| 2,700,963 | 2/1955 | Crawford | 123/32 SP |
| 2,808,037 | 10/1957 | Von Seggern | 123/32 ST |
| 3,830,205 | 8/1974 | Date | 123/32 SP |

*Primary Examiner*—Wendell E. Burns
*Assistant Examiner*—Ronald B. Cox
*Attorney, Agent, or Firm*—Lyon and Lyon

[57] ABSTRACT

Reduction of NO$_x$ emissions from a four-cycle stratified charge internal combustion piston engine is accomplished by (a) spark ignition of a rich mixture in a first chamber containing residual exhaust gas, followed by (b) torch ignition of rich mixture in a second chamber under turbulent conditions, causing (c) torch ignition of a stratified charge in a lean mixture in the main combustion chamber. The result is a reduction in peak temperature in the combustion process, with consequent reduction in NO$_x$ emissions in the engine exhaust gases. Exhaust gas is not recirculated. Said first chamber, which contains residual gas from the previous combustion cycle, contains the spark gap between spark plug electrodes and the spark gap is located near a restricted connection between the first and second chambers and remote from a closed end of the first chamber. Means are provided for changing the volume of said first chamber while the engine is operating, in accordance with variations in load on the engine.

19 Claims, 8 Drawing Figures

METHOD AND APPARATUS USING PROPORTIONAL RESIDUAL GAS STORAGE TO REDUCE NO$_X$ EMISSIONS FROM INTERNAL COMBUSTION ENGINES

This invention relates to internal combustion engines of the spark ignition piston type and is particularly directed to improvements over the three-valve stratified-charge engine disclosed in the copending application of Date et al. Ser. No. 353,786 filed Apr. 23, 1973. The device and method of the present invention relate to an engine of this type in which a lean mixture is delivered to the main combustion chambers and a rich mixture is delivered to auxiliary combustion chambers. Each auxiliary chamber is connected to its respective main chamber through a restricted torch nozzle. The overall air-fuel ratio is leaner than stoichiometric so that excess oxygen is present in the exhaust gases.

The principal object of the present invention is to provide further reduction of oxides of nitrogen (referred to as NO$_x$) in the exhaust gases discharged into the atmosphere. The present invention enables the NO$_x$ emissions level to be lowered while at the same time avoiding any increase in carbon monoxide (CO) or unburned hydrocarbon (HC) emissions.

Conventional automobile engines presently being manufactured commonly recirculate considerable quantities of exhaust gas mixed with the incoming combustible mixture of fuel and air. However, such conventional recirculation of exhaust gas reduces the efficiency of the engine, and under variable operating conditions encountered by automobile engines an increase in emissions of CO and HC is brought about by such recirculation. Also, it is well known that "drivability" suffers when recirculation of exhaust gas is employed. Moreover, the recirculation manifold is subject to objectionable accumulation of carbon.

It is a feature of the present invention that residual exhaust gas is mixed with the rich mixture from each auxiliary chamber to reduce NO$_x$ generation, but without increasing the total residual gas volume. No complicated installation is required to recirculate exhaust gas, but the beneficial effect of reducing NO$_x$ is obtained.

In accordance with the present invention, a residual gas chamber is employed in addition to each auxiliary chamber. This residual gas chamber is located and positioned so that it has a restricted opening at one end communicating with the auxiliary chamber which receives the rich mixture by way of the "third" valve. The spark gap between the plug electrodes is positioned in this residual gas chamber at a location near the restricted opening. This comparatively simple structure and the method of operation reduce the production of NO$_x$ to a surprising degree, without any noticeable side effects or secondary phenomenon adversely affecting performance of the engine. Exhaust gases are not recirculated, but residual gases remaining in the residual gas chamber at the end of the exhaust stroke are employed to reduce NO$_x$.

In the general plan of operation, residual exhaust gases remain in the main combustion chamber, the auxiliary chamber and in the residual gas chamber at the end of the exhaust stroke of the piston. During the subsequent intake stroke of the piston, the main intake valve opens to admit a lean mixture into the main combustion chamber, and the auxiliary or "third" valve opens to admit rich mixture into the auxiliary chamber. The exhaust valve in the main chamber closes. During the course of the intake stroke the quantity of residual gas in the residual gas chamber remains substantially unchanged, but rich mixture fills the auxiliary chamber and is drawn through the torch nozzle into the main chamber where it forms a region of relatively rich mixture encompassed within a larger region of relatively lean mixture. Some residual exhaust gases are dispersed in the main chamber. During the following compression stroke of the piston, the exhaust valve, the main inlet valve, and the auxiliary valve are closed and the increase in pressure in the main chamber causes reverse flow through the torch nozzle so that the mixture in the auxiliary chamber is leaner than when initially inducted, and so that the residual gas chamber containing the spark gap between the spark plug electrodes then contains a compressed mixture of air, fuel and residual gases.

At the end of each compression stroke, the total amount of residual gas in all three chambers is constant. However, the amount of residual gas in the residual gas chamber is proportional to the amount of fresh charge in that chamber. An ignitable fresh mixture exists around the spark gap near the restricted opening and remote from the end wall.

Near the end of the compression stroke, this mixture in the residual gas chamber is ignited by the spark plug electrodes, and the peak temperature of the burning mixture is lower than it would be if the residual exhaust gases were not present. The increase in pressure and temperature of the burning gases causes a first torch or flame jet to extend through the restricted opening to ignite the rich mixture in the auxiliary chamber. This burning mixture then projects a torch flame through the torch nozzle into the main combustion chamber to initiate burning in the relatively rich region and thereby ignite the larger volume of relatively lean mixture within the main combustion chamber. The peak temperatures generated in the spark plug chamber and auxiliary chamber are lower than the peak temperature which would have been generated if no separate spark plug chamber containing residual gas were employed. The turbulent mixture in the auxiliary chamber includes burned gas from the residual gas chamber, thus lowering the peak temperature.

Also, better combustion in the main combustion chamber is achieved because of the smaller amount of residual gas remaining in the main chamber at the time of ignition.

Burning of the lean mixture in the main combustion chamber continues throughout the power stroke. Only the main chamber has an exhaust valve and it is open during the exhaust stroke to allow the exhaust gases to leave the engine. As set forth in the copending application referred to above, the exhaust gases continue to burn in the exhaust system downstream from the exhaust valve in order that the excess air may continue to burn any unburned hydrocarbons (HC) and in order that carbon monoxide (CO) may be oxidized to carbon dioxide (CO$_2$) before discharge into the atmosphere.

It is also a feature of the method and apparatus of this invention to provide means for varying the volume of the residual gas chamber, so that the volume may change in a desired manner as the load on the engine changes.

Other and more detailed objects and advantages will appear hereinafter.

Figure 1:
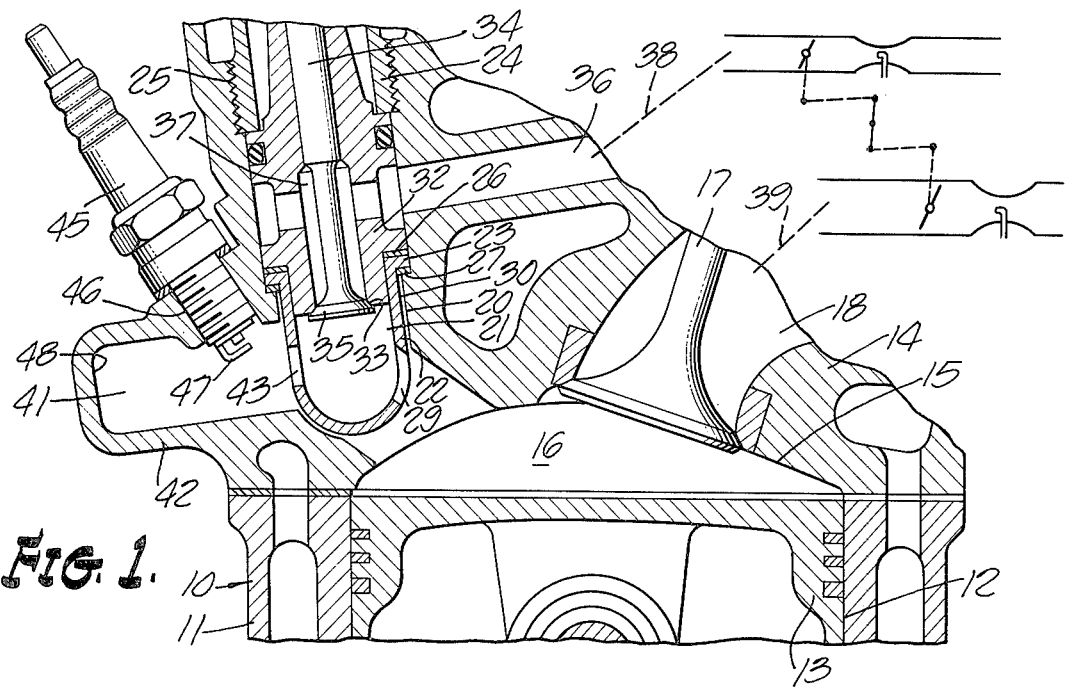
FIG. 1 is a sectional elevation partly broken away showing a preferred embodiment of this invention.

Referring to the drawings, the internal combustion engine generally designated 10 includes a water cooled block 11 having one or more cylinders 12 each with a piston 13 mounted to reciprocate therein. A water cooled head 14 is secured to the block 11 by conventional means, not shown, and this head is provided with a domed recess 15 cooperating with the piston 13 and cylinder 12 to define a main combustion chamber 16. A main intake valve 17 controls communication between the main intake passage 18 and the main combustion chamber 16. An exhaust valve, not shown, communicates with the main chamber 16 to control flow of exhaust gases therefrom.

An auxiliary combustion chamber 21 is defined with a thin wall stainless steel cylindrical cup 22 secured within cavity 20 provided in the water cooled engine head 14. One end of this cup 22 has a hemispherical shape and the other end is open and is provided with a terminal flange 23. A sleeve 24 connected by threads 25 to the engine head 14 clamps the flange 23 between insulating washers 26 and 27 to secure the cup 22 in place. A first aperture 29 in the cup forms a torch nozzle which establishes restricted communication between the auxiliary combustion chamber 21 and the main combustion chamber 16. A small clearance space 30 separates the cup 22 from the walls of the cavity 20 and this space acts to insulate the cup and minimize transfer of heat from the cup to the engine head 14.

A portion 32 of the lower end of the threaded sleeve 24 projects into the open end of the cup 22, and this portion of the sleeve 24 carries a stationary seat 33. An auxiliary of third valve 34 includes a valve head 35 which closes against the seat 33. The valve 34 controls intake of rich combustible mixture through the passage 36 in the engine head 14 and through the interior passage 37 in the threaded sleeve 24. First and second carburetors (not shown) supply rich mixture and lean mixture, respectively, through throttle controlled passageways 38 and 39 connected to passages 36 and 18, respectively, all as shown in the copending application identified above.

In accordance with the present invention, a chamber 41 for residual gas is formed by wall 42 of the engine head 14. The cup 22 forms one end of the chamber 41 and a second aperture 43 in the cup 22 establishes restricted communication between the chamber 41 and the auxiliary combustion chamber 21. A conventional spark plug 45 is connected by threads 46 to walls 42 of the engine head 14, and the electrodes 47 are positioned within the chamber 41 to form a spark gap which is located near the aperture 43 and remote from the end wall 48.

Tests have shown that most desirable relationships between the sizes of the chambers 41, 21 and 16, as well as the relationships to the size of the apertures 29 and 43, are as follows:

$$\frac{V_a + V_{rg}}{V_m + V_a + V_{rg}} = 0.05 - 0.30$$

$$\frac{V_{rg}}{V_a + V_{rg}} = 0.25 - 0.60$$

$$\frac{\sqrt{F_t}}{\sqrt[3]{V_{rg} + V_a}} = 0.18 - 0.60$$

$$\frac{\sqrt{F_{rg}}}{\sqrt[3]{V_{rg}}} = 0.20 - 0.90$$

Where:
$V_a$ = volume of auxiliary chamber 21
$V_{rg}$ = volume of residual gas chamber 41
$V_m$ = volume of main chamber 16 at top dead center
$F_t$ = area of torch nozzle aperture 29
$F_{rg}$ = area of restricted opening 43

In a commercial form of the invention as embodied in a four-cylinder automobile engine of about 2,000 cc displacement, the following volumes and sizes have produced very low $NO_x$ emissions:

$V_a$ = 5.5 cc
$V_{rg}$ = 4.0 cc
$F_t$ = 0.5 sq. cm.
$F_{rg}$ = 0.5 sq. cm.

The exhaust valve (not shown), the main intake valve 17, and the auxiliary valve 34 are opened and closed in timed sequence by conventional cam mechanisms. At the end of the exhaust stroke of the piston 13, residual gases remain in the main combustion chamber 16 and in the auxiliary chamber 21 and in the residual gas chamber 41. During the subsequent intake stroke of the piston, the main intake valve 17 opens to admit a lean mixture into the main combustion chamber, and the auxiliary valve 34 opens to admit a rich mixture into the auxiliary chamber 21. The exhaust valve in the main chamber closes. During the intake stroke of the piston, very little change occurs in the chamber 41, but rich mixture fills the auxiliary chamber 21 and is drawn through the torch nozzle 29 into the main chamber 16. Because of the shape of the main chamber 16, minimum turbulence is generated, and the rich mixture from the auxiliary chamber 21 forms a region of relatively rich mixture encompassed within a larger region of relatively lean mixture. In other words, a stratified charge is formed in the main chamber 16. Some residual exhaust gases remain dispersed in the main chamber 16.

During the following compression stroke of the piston 13, all of the valves are closed and the increase in pressure in the main chamber 16 causes reverse flow through the torch nozzle 29 so that the mixture in the auxiliary chamber 21 is leaner than when initially inducted, and so that the residual gas chamber 41 containing the spark plug electrodes then contains a compressed mixture of air, fuel and residual exhaust gases. In the particular 2,000 cc displacement engine mentioned above, it has been found that the residual gas percentage in each chamber at the end of the compression stroke, as compared to the total amount of gas in each chamber, is substantially as follows when the engine is operating under partial load:

| | |
|---|---|
| Main chamber 16 | 12% |
| Auxiliary chamber 21 | 14% |
| Spark plug chamber 41 | 20% |

Accordingly, at the time of firing, the mixture in the spark plug chamber 41 has a greater percentage of residual gas than either the auxiliary chamber 21 or the main chamber 16. When the spark plug is energized to produce a spark at the gap between the electrodes 47, the peak temperature of the burning mixture is lower than it would be if the residual exhaust gases were not present in the chamber 41. A first flame jet carrying both burning and residual gases is projected through the aperture 43 to ignite the relatively small quantity of rich mixture in the auxiliary chamber 21, producing high turbulence. A second flame jet or torch is then projected through the nozzle 29 to initiate burning of the stratified charge and thereby ignite the large volume of relatively lean mixture within the main combustion chamber 16.

The axis of the apertures 43 and 29 are purposely misaligned so that (1) the first flame jet passing through the aperture 43 does not also pass directly through the aperture 29, (2) the spark plug electrodes are not fouled during the compression stroke by direct infringement of a rich mixture jet, and (3) turbulence in the residual gas chamber 41 is minimized during the compression stroke to cause the main body of residual gas to be present under compression adjacent said end wall 48.

After completion of the power stroke, the exhaust valve opens to allow the exhaust gases to leave the engine, and they continue to burn in the exhaust system downstream from the exhaust valve. Because the overall air-fuel ratio is leaner than stoichiometric, excess air is present in the exhaust system to burn any unburned hydrocarbons and to oxidize the carbon monoxide to carbon dioxide before discharge into the atmosphere.

Figure 2:
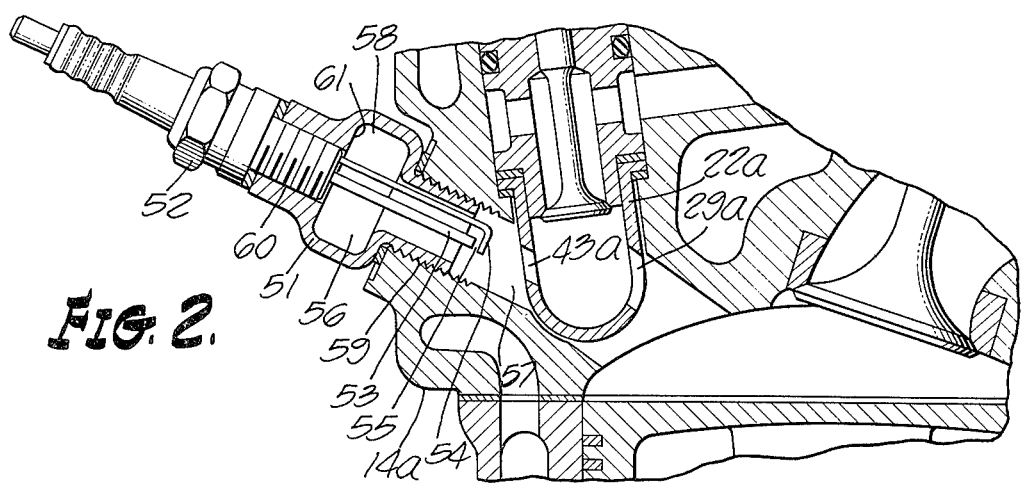
FIG. 2 is a view similar to FIG. 1 showing a first modification, employing a spark plug with long electrodes.

The modified form of the invention shown in FIG. 2 uses the same method of operation but the structure differs in that a sleeve 51 is employed in connection with a special spark plug 52 having exceptionally long electrodes 53 and 54 forming a spark gap 55 between them. The space 56 within the sleeve 51 together with the space within the bore 57 in the engine head 14a cooperate to form a residual gas chamber generally designated 58. The sleeve 51 is fixed to the engine head 14a by threads 59, and the spark plug 52 is fixed to the sleeve 51 by threads 60. The spark gap 55 is positioned in the chamber 58 close to the aperture 43a and remote from the rear wall 61. The axis of the aperture 43a in the cup 22a is misaligned from the axis of the torch nozzle 29a. The operation of this form of the invention is similar to that described above. This modification, however, has the advantage that the type of threevalve stratified charge engine disclosed in the copending application referred to above may be directly converted to use the principles of this invention for further reduction of $NO_x$ emissions, by simply replacing the standard spark plugs with the special spark plugs 52 and the sleeves 51.

Figure 3:
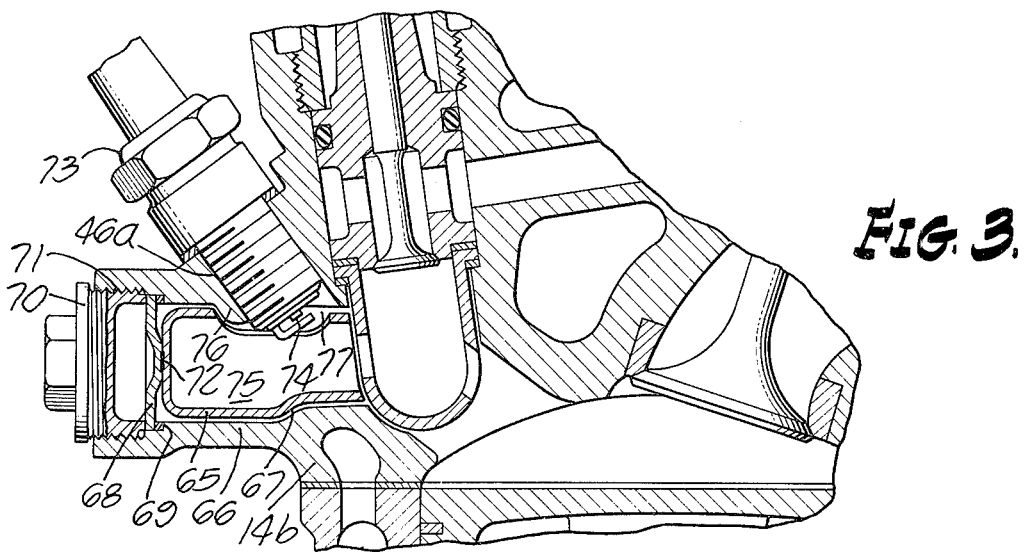
FIG. 3 is a view similar to FIG. 1 showing a second modification, employing a liner within the residual gas chamber.

The modified form of the invention shown in FIG. 3 is similar to that shown in FIG. 1, but with the additional feature that a thin wall stainless steel liner 65 is placed within a cavity 66 formed in the engine head 14b. A small clearance space 67 between the liner 65 and the walls of the engine head 14b serves to insulate the liner and minimize transfer of heat from the liner to the engine head. The liner 65 is held in proper position within the cavity 67 by means of a circular disk 68 spot welded at 72 to the end wall of the liner 65. This disk 68 is clamped against a shoulder 69 by means of a plug 70 connected to the walls of the engine head 14b by threads 71.

A conventional spark plug 73 is connected by threads 74 to the head 14a and the spark plug electrodes 74 are positioned within the residual gas chamber 75. A portion of the spark plug including the electrodes 74, and a portion of the wall 76 of the head 14b both project through a lateral opening 77 in the wall of the liner 65. The proportions of the parts are such that, in the absence of the spark plug 73 and the closure plug 70, the liner 65 with its centering disk 68 may be moved through a curved path to accomplish installation within the cavity 66, and to bring the opening 77 into position to encompass a projecting portion 76 of the wall of the engine head 14b.

The operation of this form of the invention is the same as that described in connection with FIG. 1, except that the thin wall stainless steel liner 65 heats up rapidly under initial startup conditions and stays hot during operation of the engine. This has a beneficial effect on engine performance.

Figure 4:
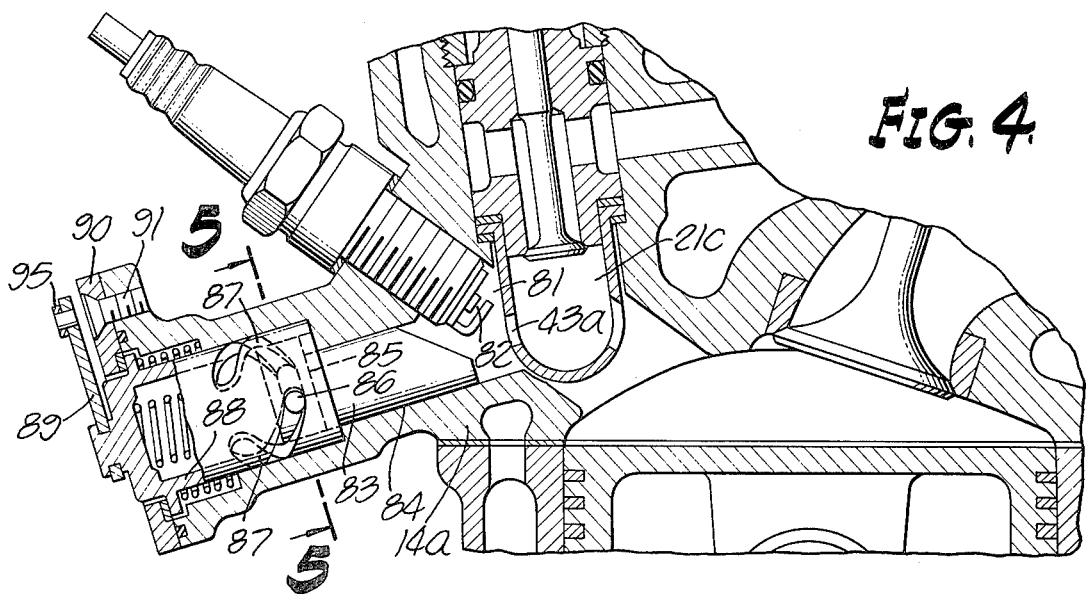
FIG. 4 is a sectional elevation showing a third modification which includes apparatus for changing the volume of the chamber which contains the spark plug electrodes, the chamber being adjusted to minimum size.
Figure 7:
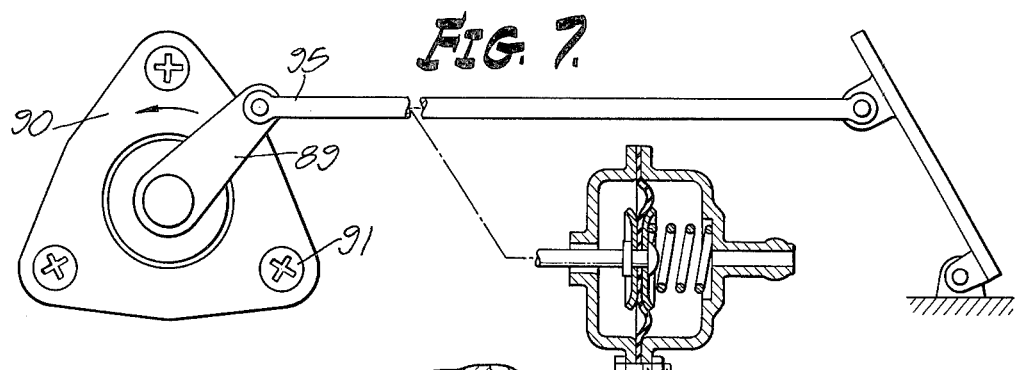
FIG. 7 is an end view taken in the direction 7—7 as shown in FIG. 4.
Figure 6:
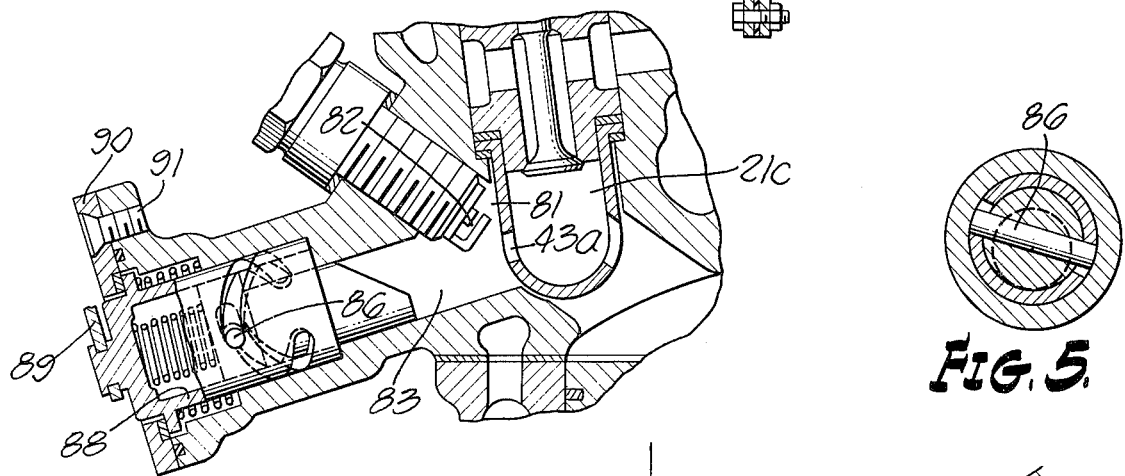
FIG. 6 is a view similar to FIG. 4, the spark plug chamber being adjusted to maximum size.
Figure 5:
FIG. 5 is a sectional detail taken substantially on the lines 5—5 as shown in FIG. 4.

The form of the invention shown in FIGS. 4-7 includes a residual gas chamber which has a volume which may be increased or decreased as desired, during the operation of the engine. The exhaust gas chamber 81 contains the spark plug electrodes 82 and the chamber communicates with the auxiliary chamber 21c through the aperture 43c as previously described. However, a sliding end wall or plug 83 is received within the bore 84 in the walls of the engine head 14c, and this plug is movable between the advanced position shown in FIG. 4 and the retracted position shown in FIG. 6. Accordingly, the minimum dimensions of the residual gas chamber 81 are shown in FIG. 4, while the maximum dimensions are shown in FIG. 6. Means are provided for adjusting the position of the sliding plug 83 within the bore 84, and as shown in the drawings this means includes a cylindrical member 85 fixed to the plug 83 in offset eccentric position and carrying a pair of radially projecting pins 86. Each pin is received in a helical groove 87 provided in a rotary actuator sleeve 88 mounted concentrically with the member 85. The actuator sleeve 88 may be turned through a portion of one revolution by means of a crank arm 89 fixed to a projecting end of the sleeve. A retainer plate 90 is secured to the engine head 14c by means of threaded fastenings 91. From this description it will be understood that turning of the actuator sleeve 88 by means of the crank arm 89 serves to advance or retract the sliding plug 83 to vary the volume of the residual gas chamber 81.

Figure 8:
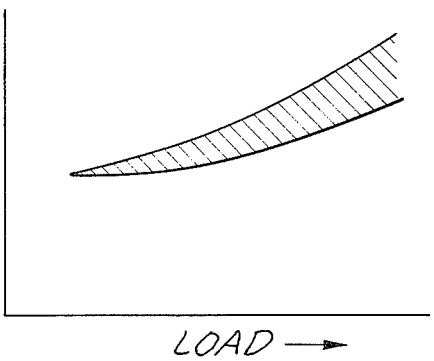
FIG. 8 is a diagram showing a desired relationship between the volume of the spark plug chamber and the load on the engine.

The graph shown in FIG. 8 shows that it is desirable to vary the volume of the residual gas chamber in accordance with variations of load on the engine. In many cases it may be desirable to increase the chamber volume continuously with increasing load on the engine, as shown by the graph. This may be accomplished by connecting the control rod 95 for the arm 89 to either the accelerator pedal 96 or to the pressure sensitive mechanism 97 which is operated by vacuum in the intake manifold of the engine.

Having fully described our invention, it is to be understood that we are not to be limited by the details herein set forth but that our invention is of the full scope of the appended claims.

We claim:

1. In a four-cycle spark-ignition internal combustion reciprocating piston engine having a main combustion chamber with a valved intake passage for a lean mixture, an auxiliary combustion chamber having a valved intake passage for a rich mixture, and a torch nozzle restriction connecting said chambers, the improvement for minimizing $NO_x$ in the engine exhaust gases comprising, in combination: a residual gas chamber having a restricted opening at one end communicating with the auxiliary chamber and having an end wall remote from said opening, a spark plug having electrodes forming a spark gap positioned in said residual gas chamber nearer to the restricted opening than to said end wall, the position of said restricted opening with respect to the auxiliary chamber being such that the suction stroke of the piston serving to draw a rich mixture into and through the auxiliary chamber and through the torch nozzle restriction into the main chamber does not substantially change the contents of the residual gas chamber which comprise residual burned gas from the previous combustion cycle of the engine, the restricted opening serving to promote mixing of rich mixture and residual gas in said residual gas chamber during the compression stroke of the piston, whereby at the time of ignition, the concentration of residual gas near said end wall of said residual gas chamber is greater than in the region containing said spark gap.

2. The combination set forth in claim 1 in which the axis of the torch nozzle restriction is misaligned with respect to the axis of said restricted opening.

3. The combination set forth in claim 1 in which the auxiliary chamber is formed within a thin wall metal cup of low heat capacity, the cup having a first aperture forming the torch nozzle restriction and a second aperture forming said restricted opening.

4. The combination set forth in claim 1 in which the auxiliary chamber is formed within a thin wall metal cup of low heat capacity, the cup having a cylindrical portion closed by a curved bottom portion, the cup having a first aperture in both portions forming the torch nozzle restriction, the cup having a second aperture in the cylindrical portion at right angles thereto forming said restricted opening.

5. The combination set forth in claim 1 in which said residual gas chamber is substantially cylindrical and extends at substantially right angles from a wall of said auxiliary chamber.

6. In a four-cycle spark-ignition internal combustion reciprocating piston engine having a main combustion chamber with a valved intake passage for a lean mixture, an auxiliary combustion chamber with a valved intake passage for a rich mixture, and a torch nozzle connecting said chambers, the improvement for minimizing $NO_x$ in the engine exhaust gases comprising, in combination: a residual gas chamber having a restricted opening communicating with the auxiliary chamber and having an end wall remote from said opening, a spark plug having electrodes forming a spark gap positioned in said residual gas chamber, the volumes of the chambers being related as follows:

$$\frac{V_a + V_{rg}}{V_m + V_a + V_{rg}} = 0.05 - 0.30$$

where:

$V_a$ = volume of auxiliary chamber
$V_{rg}$ = volume of residual gas chamber
$V_m$ = volume of main chamber at top dead center.

7. In a four-cycle spark-ignition internal combustion reciprocating piston engine having a main combustion chamber with a valved intake passage for a lean mixture, an auxiliary combustion chamber with a valved intake passage for a rich mixture, and a torch nozzle connecting said chambers, the improvement for minimizing $NO_x$ in the engine exhaust gases comprising, in combination: a residual gas chamber having a restricted opening communicating with the auxiliary chamber and having an end wall remote from said opening, a spark plug having electrodes forming a spark gap positioned in said residual gas chamber, the volumes of the auxiliary chamber and the residual gas chamber being related as follows:

$$\frac{V_{rg}}{V_a + V_{rg}} = 0.25 - 0.60$$

where:

$V_a$ = volume of auxiliary chamber
$V_{rg}$ = volume of residual gas chamber.

8. In a four-cycle spark-ignition internal combustion reciprocating piston engine having a main combustion chamber with a valved intake passage for a lean mixture, an auxiliary combustion chamber with a valved intake passage for a rich mixture, and a torch nozzle connecting said chambers, the improvement for minimizing $NO_x$ in the engine exhaust gases comprising, in combination: a residual gas chamber having a restricted opening communicating with the auxiliary chamber and having an end wall remote from said opening, a spark plug having electrodes forming a spark gap positioned in said residual gas chamber, the cross section area of the torch nozzle being related to the volumes of the residual gas chamber and auxiliary chamber as follows:

$$\frac{\sqrt{F_t}}{\sqrt[3]{V_{rg} + V_a}} = 0.18 - 0.60$$

where:

$F_t$ = area of torch nozzle
$V_{rg}$ = volume of residual gas chamber
$V_a$ = volume of auxiliary chamber.

9. In a four-cycle spark-ignition internal combustion reciprocating piston engine having a main combustion chamber with a valved intake passage for a lean mixture, an auxiliary combustion chamber with a valved intake passage for a rich mixture, and a torch nozzle connecting said chambers, the improvement for minimizing $NO_x$ in the engine exhaust gases comprising, in combination: a residual gas chamber having a restricted opening communicating with the auxiliary chamber and having an end wall remote from said opening, a spark plug having electrodes forming a spark gap positioned in said residual gas chamber, the area of the restricted opening as compared to the volume of the residual gas chamber being as follows;

$$\frac{\sqrt{F_{rg}}}{\sqrt[3]{V_{rg}}} = 0.20 - 0.90$$

where;

$F_{rg}$ = area of restricted opening $V_{rg}$ = volume of residual gas chamber.

10. The combination set forth in claim 1 in which the spark plug electrodes are elongated to extend through at least a portion of the residual gas chamber.

11. The combination set forth in claim 1 in which said residual gas chamber is formed in a sleeve connected by threads at one end to the engine, and connected by threads at the other end to the spark plug, the spark plug electrodes being extended to position the spark gap near said restricted opening.

12. The combination set forth in claim 1 in which the residual gas chamber is formed within a thin wall liner of low heat capacity, the liner having an opening to receive the spark plug electrodes.

13. The combination set forth in claim 1 in which means are provided for varying the volume of the residual gas chamber.

14. In a four-cycle spark-ignition internal combustion reciprocating piston engine having a main combustion chamber with a valved intake passage for a lean mixture, an auxiliary combustion chamber with a valved intake passage for a rich mixture, and a torch nozzle connecting said chambers, the improvement for minimizing $NO_x$ in the engine exhaust gases comprising, in combination: a residual gas chamber having a restricted opening communicating with the auxiliary chamber and having an end wall remote from said opening, a spark plug having electrodes forming a spark gap positioned in said residual gas chamber, means for varying the volume of the residual gas chamber, said means including a plug slidably mounted within the residual gas chamber to define the end wall thereof, and means for moving said plug in accordance with engine operating conditions.

15. In a four-cycle spark-ignition internal combustion reciprocating piston engine, the combination of: a main combustion chamber with an intake passage for a lean mixture, an auxiliary combustion chamber having an intake passage for a rich mixture, a torch nozzle restriction connecting said chambers, mechanically operated valves movable in timed sequence for controlling flow through said intake passages, a residual gas chamber having a restricted opening at one end communicating with the auxiliary chamber and having an end wall remote from said opening, a spark plug having electrodes forming a spark gap positioned in said residual gas chamber nearer to the restricted opening than to said end wall, the position of said restricted opening with respect to the auxiliary chamber being such that the suction stroke of the piston serving to draw a rich mixture into and through the auxiliary chamber and through the torch nozzle restriction into the main chamber does not substantially change the contents of the residual gas chamber which comprise residual burned gas from the previous combustion cycle of the engine, the restricted opening serving to promote mixing of rich mixture and residual gas in said residual gas chamber during the compression stroke of the piston, whereby at the time of ignition, the concentration of residual gas near said end wall of said residual gas chamber is greater than in the region containing said spark gap.

16. For use with a four-cylinder spark-ignition internal combustion reciprocating engine having an auxiliary combustion chamber connected through a torch nozzle with a main combustion chamber, the improvement comprising: means forming a residual gas chamber having a restricted opening at one end, means for securing said gas chamber to the engine to establish communication with the auxiliary chamber through said restricted opening, said chamber having a wall remote from said opening, means on said chamber for connection with a spark plug so that the spark gap defined by the spark plug electrodes is positioned within the residual gas chamber nearer to the restricted opening than to said wall, the position of said restricted opening with respect to the auxiliary chamber being such that the suction stroke of the piston serving to draw a rich mixture into and through the auxiliary chamber and through the torch nozzle restriction into the main chamber does not substantially change the contents of the residual gas chamber which comprise residual burned gas from the previous combustion cycle of the engine, the restricted opening serving to promote mixing of rich mixture and residual gas in said residual gas chamber during the compression stroke of the piston, whereby at the time of ignition, the concentration of residual gas near said wall of said residual gas chamber is greater than in the region containing said spark gap.

17. In a four-cycle spark-ignition internal combustion reciprocating piston engine for minimizing emissions of $NO_x$ in the engine exhaust gases, the combination of: a main combustion chamber having a valved intake passage for a lean mixture, an auxiliary combustion chamber having a valved intake passage for a rich mixture, means forming a torch nozzle restriction connecting said chambers, means forming a residual gas chamber having a restricted opening at one end communicating with said auxiliary chamber, and having an end wall remote from the restricted opening, the total volume of the auxiliary chamber and residual gas chamber being from 5 to 30% of the total combined volume of all three chambers, the suction stroke of the piston serving to draw a lean mixture into the main chamber and a rich mixture into and through the auxiliary chamber and torch nozzle restriction into the main chamber without materially affecting the contents of the residual gas chamber, the shape of the residual gas chamber and the position of the restricted opening acting to promote mixing so that after the compression stroke of the piston the concentration of residual gas from the previous combustion cycle of the engine mixed with rich mixture is greater near said end wall of the residual gas chamber than near said restricted opening, sparking means in said residual gas chamber positioned nearer to said restricted opening than to said end wall for igniting the mixture therein whereby a first flame is caused to extend through the restricted opening to produce turbulent ignition in the auxiliary chamber, thereby causing a second flame to extend through the torch nozzle restriction and into the main chamber.

18. The method of operating a four-cycle spark-ignition internal combustion reciprocating engine for minimizing emissions of $NO_x$ in the engine exhaust gases, the engine having a main chamber and an auxiliary chamber connected by a torch nozzle, one wall of the main chamber being formed by a piston, comprising the following steps: retaining in an ignition chamber a quantity of residual gas from the previous combustion cycle of the engine, inducting a lean air-fuel mixture into a main combustion chamber, simultaneously inducting a rich air-fuel mixture into the auxiliary chamber and a portion thereof through the torch nozzle into the main chamber, all without substantial change in the residual gas in the ignition chamber, the overall air-fuel ratio being leaner than stoichiometric, compressing the mixtures, mixing the residual gas during compression with a quantity of rich mixture from the auxiliary chamber, spark igniting the compressed mixture in the ignition chamber adjacent a restriction to send a flame through the restriction into the auxiliary chamber to ignite the contents thereof and thereby cause a flame to propagate through the torch nozzle into the main chamber.

19. The combination as set forth in claim 15 in which throttle valves are positioned upstream from the said intake valves in each of said intake passages.

* * * * *